USOO5503883A

United States Patent [19]
Kell, Jr. et al.

[11] Patent Number: 5,503,883
[45] Date of Patent: Apr. 2, 1996

[54] BIODEGRADABLE WREATH RING

[76] Inventors: Dugald Kell, Jr., RR1, Box 2010, Surry, Me. 04684; Dugald Kell, Sr., 280 Washington St., Brewer, Me. 04412

[21] Appl. No.: 295,529

[22] Filed: Aug. 24, 1994

[51] Int. Cl.⁶ ..................................... A41G 1/00
[52] U.S. Cl. .................. 428/10; 264/DIG. 67; 493/958
[58] Field of Search .............. 428/10; 264/DIG. 67; 493/958; 362/122

[56] References Cited

U.S. PATENT DOCUMENTS

| | | | |
|---|---|---|---|
| 1,482,537 | 2/1924 | Alter et al. | 428/10 |
| 1,517,848 | 12/1924 | McClelland | 428/10 X |
| 1,772,357 | 8/1930 | Manson | 428/10 X |
| 1,951,717 | 3/1934 | Wolf | 428/10 X |
| 2,033,173 | 3/1936 | Barocas | 428/10 X |
| 2,098,314 | 11/1937 | Shalomith | 428/10 X |
| 2,115,358 | 4/1938 | Buschman | 428/10 X |
| 2,200,948 | 5/1940 | Bufton | 428/10 X |
| 2,499,740 | 3/1950 | Glance | 428/10 X |
| 2,727,326 | 12/1955 | MacGregor | 428/10 |
| 3,974,915 | 8/1976 | Mieuli, Jr. | 428/913.3 X |
| 4,283,445 | 8/1981 | Bartholl | 428/17 |
| 4,364,102 | 12/1982 | Huppert et al. | 428/10 X |
| 5,273,796 | 12/1993 | Elbing et al. | 428/29 |

*Primary Examiner*—Henry F. Epstein
*Attorney, Agent, or Firm*—Daniel H. Kane, Jr.

[57] ABSTRACT

A biodegradable wreath ring provides the central framework for constructing a decorative wreath from plant tips and decorative materials secured to the wreath ring. The wreath ring is of generally circular configuration with specified diameter and is constructed from multiple layers of strips of paper laminated one over another in the radial direction of the ring and bonded together preferably using a biodegradable resin or adhesive material. The wreath ring is of generally cylindrical configuration having a cylinder radial thickness and a cylinder height thickness. The ring is constructed with a sufficient number of layers of paper in the radial direction and with sufficient cylinder radial thickness and height thickness to provide the required structural strength to support a constructed wreath of decorative material having the selected diameter. The wreath ring is biodegradable for recycling fiber, composting, chipping or combustion along with a wreath constructed on the wreath ring after the wreath has served its decorative purpose. The ring is preferably a cylindrical slice, cut with specified cylinder height thickness from a laminated paper tube having a specified cylinder radial thickness and selected number of layers of laminated paper in the radial direction of the tube.

14 Claims, 2 Drawing Sheets

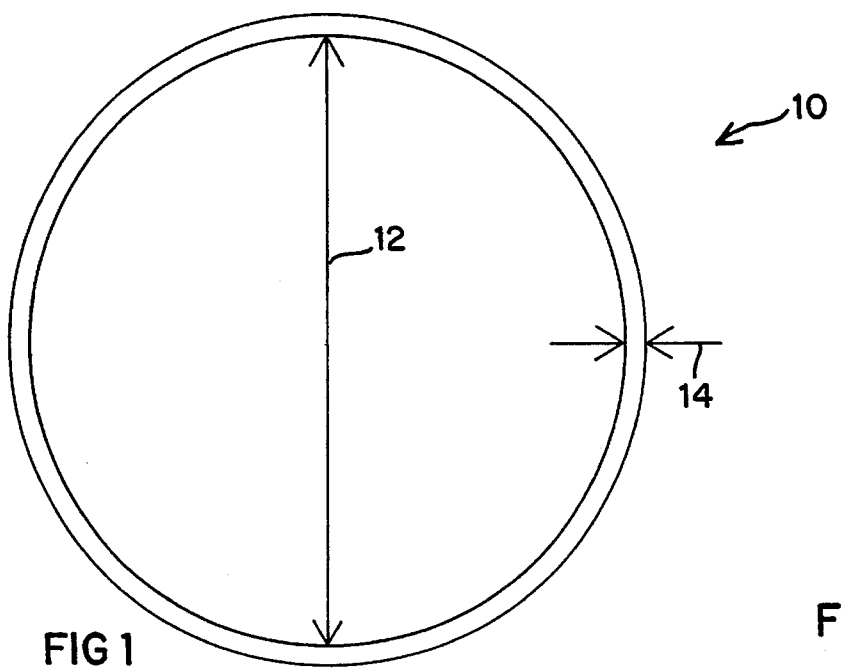
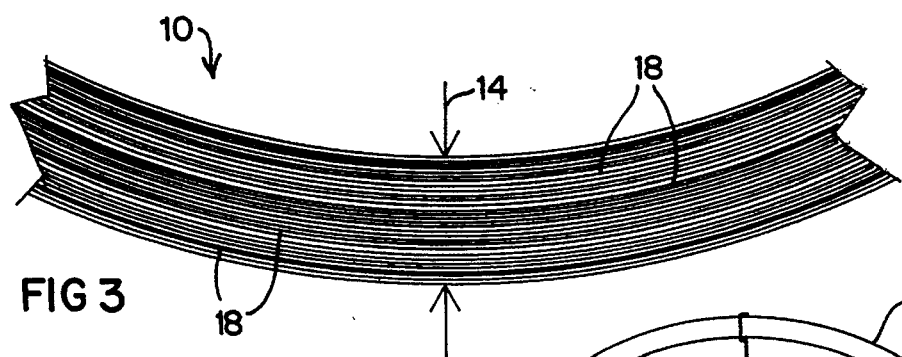
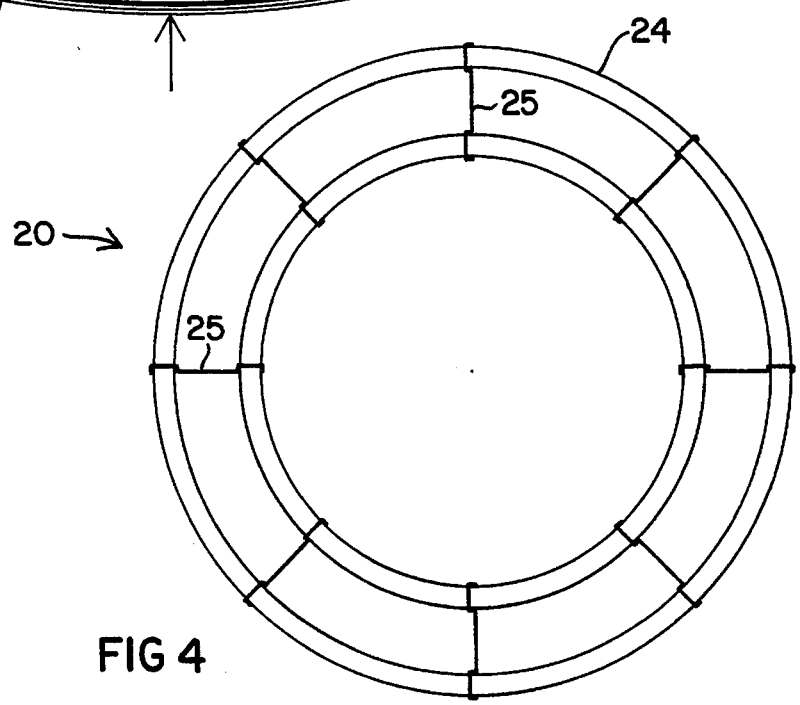

BIODEGRADABLE WREATH RING

TECHNICAL FIELD

This invention relates to a new wreath ring for constructing and assembling a Christmas wreath, cemetery wreath, or other decorative or ornamental wreath from balsam fir tips, other evergreen tips, and other plant and decorative materials. The wreath ring forms the internal framework for constructing and supporting such a decorative wreath. The wreath ring of the present invention is biodegradable along with the materials comprising the wreath for recycling, composting, chipping or combustion.

BACKGROUND ART

The traditional wreath ring is typically a circular ring or crimped ring of metal wire stock or rod formed with selected diameters according to the desired size of the final wreath. The wreath ring may consist of a single wire ring, known as a single rail wreath ring or multiple rings spaced from each other by rigid wire links. The multiple rings are known as double rail or multi-rail wreath rings. A wreath is assembled by clamping or tying the stems of balsam fir tips or any other desired plant tips such as evergreen tips, holly tips, etc. to the basic frame provided by the wreath ring. Soft wire clamps or ties may be provided around the wreath ring for clamping over the stems so that the tips cover the preceding clamp. In this way the wreath ring itself and wire clamps or ties are not visible when the decorative wreath is completed.

A disadvantage of traditional wreath rings is that the metal rod frame or wire stock frame is not disposable with and as a part of the decorative wreath. For example decorative wreaths assembled on traditional wire stock wreath rings cannot be thrown in a chipper and cannot be recycled without disassembling the wreath. Both composting and combustion leave the metal frame of the original wreath ring.

In the prior art of wreath rings or frames, hollow cardboard cores have been developed for decorative and ornamental wreaths. However, such cardboard cores do not perform the function of traditional wire stock wreath rings. The Shalomith U.S. Pat. No. 2,098,314 describes an ornamental wreath with a cardboard core in the configuration of a ring or annulus with a hollow arched or semicircular cross section. Only a single layer of cardboard is shown. The arched core is in turn wrapped with decorative material and incorporates lights. It cannot function as a traditional wreath ring for clamping or tying the stems of plant tips to the central frame or core. The Buschman U.S. Pat. No. 2,115,358 also describes a hollow tubular wreath structure similar in appearance to the Shalomith ornamental wreath although the material from which it is constructed is not mentioned. The Wolf U.S. Pat. No. 1,951,717 describes a hollow cardboard frame similar to the Shalomith ornamental wreath as does the Barocas U.S. Pat. No. 2,033,173, the Alter et al. U.S. Pat. No. 1,482,537, and the Manson U.S. Pat. No. 1,772,357. In each of these examples the hollow arched or semicircular tubular cardboard frame or core has to be wrapped with decorative materials. In each instance the hollow cardboard core frame does not function in the manner of a traditional metal wire or rod frame.

The Glance U.S. Pat. No. 2,499,740 describes a ring mounting which is in the configuration of a flat disk with radial strips. Stems of plant tips are inserted under the radial strips. Alternatively the flat disks are formed with slots and plant tips are inserted in the slots. Two disks are secured only at their outer and inner peripheries to receive these stems and conceal them between the two disks. While the Glance disks may apparently be formed of cardboard, they do not function as traditional metal wire frame wreath rings.

The McCullen U.S. Pat. No. 1,517,848 describes another flat disk ring that can be made of "pasteboard" or wood and to which light sockets are secured by screws. The Bufton U.S. Pat. No. 2,200,948 describes an annular mold of metal screen material filled with paper pulp stock. After drying it is then dipped in hot wax to render it waterproof. Plant stems are apparently "thrust" into the paper pulp mass.

OBJECTS OF THE INVENTION

It is therefore an object of the present invention to provide a wreath ring which functions in the traditional manner of receiving plant tips having their stems clamped or tied to the wreath ring while at the same time the wreath ring is biodegradable. A feature of the invention is that the biodegradable wreath ring can be recycled with the finished wreath materials by, for example, chipping, composting or combustion.

Another object of the invention is to provide a biodegradable wreath ring with the desirable characteristics of rigidity and strength similar to traditional wire stock and rod wreath ring frames.

A further object of the invention is to provide an inexpensive method of efficiently producing such biodegradable wreath rings while preserving the desirable characteristics of rigidity and strength.

DISCLOSURE OF THE INVENTION

In order to accomplish these results the invention provides a new wreath ring for constructing and assembling a decorative wreath by clamping or tying the stems of plant tips and other decorative materials to the wreath ring. The invention provides a ring of generally circular configuration with selected diameter. It is constructed from multiple layers of strips of paper or cardboard laminated one on top of another in the radial direction of the ring and bonded together using a biodegradable resin or adhesive material.

The finished ring is generally of cylindrical configuration having a cylinder radial thickness and a cylinder height thickness. The ring is constructed with a sufficient number of layers of paper or cardboard in the radial direction and with sufficient cylinder radial thickness and height thickness to provide the required structural strength to support a constructed wreath of plant tips or other decorative material having the selected diameter. As a result the wreath ring is biodegradable for recycling fiber, composting, chipping, or combustion along with the entire wreath. Thus the wreath ring can be disposed of in the same manner as the wreath materials after the wreath has served its decorative purpose.

In the preferred example embodiment the wreath ring is a cylindrical slice, cut with specified cylinder height thickness from a laminated paper tube having a specified cylinder radial thickness and selected number of layers of laminated paper in the radial direction of the tube. Generally the ring is constructed with a cylinder wall radial thickness in the range of 0.5 inches to 2 inches (1.3 cm–5 cm) and a cylinder height thickness in the range of 0.25 inches to 1.5 inches (0.6 cm–3.8 cm) according to the diameter of the wreath ring. With these dimensions, the ring can be constructed with a diameter in the range of, for example, 8" (20 cm) to 5' (1.5 m). Larger wreath rings can of course be constructed with proportionately larger radial and height thicknesses to provide the necessary structural support. In a preferred example the wreath ring is cut or constructed with approximately the same cylinder radial thickness and cylinder height thickness.

A feature of such laminated tubes is that they are constructed from a continuous roll of paper rolled in a continuous spiral around the paper tube mold and adhesively laminated or bonded one spiral layer over the other. The wreath rings according to the present invention cut or sawn from the so formed laminated paper tube are therefore also in the configuration of a spiral strip of paper wrapped and laminated on itself for the desired number of layers and cylinder radial thickness.

According to the preferred embodiment, the ring is constructed from laminated layers of brown Kraft paper bonded together by adhesive or resin selected from the silicate glues, starch glues, Elmer's (™) type glues and white glues generally which are biodegradable and in some cases soluble. Preferably the plant tips and decorative materials are secured to the wreath ring by clamping, tying, or wrapping with a clamp or cord of biodegradable material. The paper ring itself may be coated with a thin film of a temporary waterproof coating such as a polyurethane coating that wears off in time. The invention contemplates a number of embodiments including multirail rings and alternative clamps. Other objects, features, and advantages of the invention are apparent in the following specification and accompanying drawings.

BRIEF DESCRIPTION OF THE DRAWINGS

FIG. 1 is a plan view of the biodegradable wreath ring according to the invention showing the cylinder radial thickness.

FIG. 2 is a side view of the biodegradable wreath ring showing the cylinder height thickness.

FIG. 3 is a detailed fragmentary plan view of a portion of the wreath ring showing the laminated paper layers.

FIG. 4 is a plan view (or perspective view) of a double rail biodegradable wreath ring.

PREFERRED EXAMPLE EMBODIMENTS AND BEST MODE OF THE INVENTION

Figure 5:
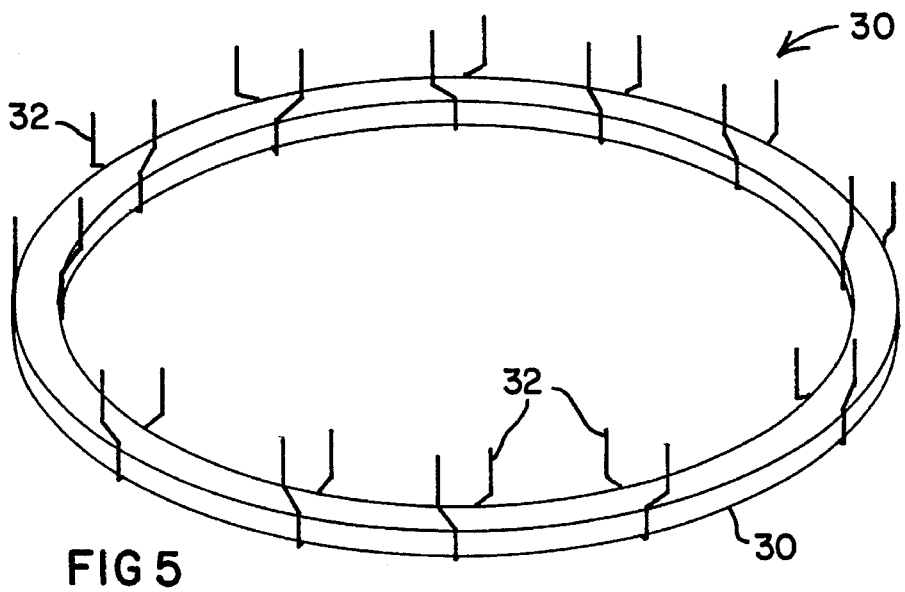
FIG. 5 is a perspective view of a biodegradable wreath ring with clamps or ties of biodegradable material.

A biodegradable wreath ring according to the invention is illustrated in FIGS. 1–3. The wreath ring 10 is generally cylindrical configuration with a specified inner diameter 12 suitable for the particular decorative wreath application. The cylindrical configuration wreath ring 10 is formed with a cylinder radial thickness 14 and cylinder height thickness 15 to impart the necessary structural strength to support a completed decorative wreath.

The construction of the biodegradable wreath 10 is illustrated in FIG. 3. The wreath ring 10 is composed of radial layers or laminations 18 of paper such as brown Kraft paper. The radial layers or laminations 18 extend in the direction of the radial thickness 14. Sufficient layers 18 of paper with the necessary gauge or caliper are used to provide the specified cylinder radial thickness 14. The layers or laminations 18 are bonded together using a biodegradable glue such as a silicate glue. A typical silicate glue is composed of silicate acid, sodium salt, and water. Other biodegradable glues and adhesives such as starch glues and white glues can of course also be used.

Structural dimensions for a typical wreath ring, for example for a Christmas wreath, are e.g., inner diameter in the range of 12"–18" (30 cm–45 cm), cylinder radial thickness of e.g. approximately 0.75" (1.9 cm), and cylinder height thickness of approximately 0.75" (1.9 cm). While such dimensions are suitable for an average Christmas wreath or other decorative wreath, larger sizes can of course also be used. For larger size wreath rings the cylinder radial thickness and cylinder height thickness are proportionately increased to give the appropriate structural strength to support the finished decorative wreath. A typical caliper or gauge for the paper may be 0,035" (890 µ) with approximately 20 or 21 plys or laminations 18 for a cylinder radial wall thickness of 0.75" (1.9 cm).

For larger wreath rings for example with an inner diameter in the range of 8" (20.3 cm) to 5' (1.52 m) the following ranges are applicable. The cylinder radial wall thickness typically varies in the range from 0.5" (1.27 cm) to 2" (5 cm), and the cylinder height thickness typically varies in the range from 0.25" (0.63 cm) to 2" (5 cm). Paper calipers may vary in the range from 0.02" (500 µ) to greater than 0,035" (890 µ). Other size wreath rings larger and smaller than these ranges can of course also be constructed with the cylinder radial wall thickness and cylinder height thickness varying according to the structural requirements of the size of the particular decorative wreath.

A multirail wreath ring 20 according to the invention is illustrated in FIG. 4. In the example of FIG. 4 the multirail wreath ring 20 is a double rail wreath ring composed of an inner rail or wreath ring 22 of specified inner diameter, and an outer rail or wreath ring 24 having a larger inner diameter. The inner and outer wreath rings 22,24 are constructed in the same manner as the wreath ring 10 of FIG. 1. The double rails 22,24 are mounted or suspended in coaxial relationship by a set of biodegradable cords 25 which form spokes between the inner and outer rails, 22,24.

For smaller wreaths up to for example approximately 2' in diameter, the inner and outer rails 22,24 are typically separated by approximately 1" (2.54 cm) to 1.5" (3.8 cm) between the inner diameter of the outer wreath ring 24 and the outer diameter of the inner wreath ring 22. For larger wreath rings up to 4' (1.2 m) in diameter the inner and outer rails 22,24 are typically separated by 2" (5 cm). For larger wreath rings in the range of 5' to 7' in diameter the coaxial inner and outer wreath rings may be separated by as much as 6" (15 cm) to 12" (30 cm).

A variety of biodegradable materials can be used for the spokes 25 suspending the inner wreath ring 22 coaxially inside the outer wreath ring 24. Cord of fabric or biodegradable synthetic material can be tied between the inner and the outer rails as shown in FIG. 4. Biodegradable plastic ties can also be used to suspend the inner rail 22 within the outer rail 24. For example biodegradable plastic slip ties 35 of the type illustrated in FIG. 6 can be used for the spokes 25. In that event the slip ties are enclosed around the inner and outer rails and are adjusted in sequence for aligning the inner rail 22 within the outer rail 24.

A wreath ring 30 with ties 32 distributed and preinstalled around the wreath ring is illustrated in FIG. 5. The wreath ring 30 is constructed in the manner illustrated in FIGS. 1–3 and the ties 32 are composed of a flexible and bendable biodegradable material such as a biodegradable plastic or stiff cord material. The ties 32 are secured at the base of the ties to the wreath ring 30 by spring tension or by glue, adhesive, etc. Balsam fir tips or other desired plant tips such as evergreen tips, holly tips, etc. are placed with the stems typically in a tangent relationship to the ring 30 and with the stems placed through one of the ties 32. The ties 32 are clamped or tied over the stems holding them in place on the wreath ring. The balsam fir tips or other desired plant tips extend along the wreath over the next tie 32 covering it and shielding it from sight. In this way a complete decorative wreath is constructed on the wreath ring 30 and the ties 32 holding the plant tips in place are hidden from view.

Figure 6:
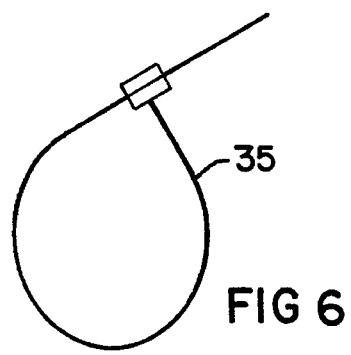
FIG. 6 is a perspective view of alternate clamps or ties for assembling plant tips and decorative materials on the wreath ring.

According to an alternative procedure, slip ties 35 such as illustrated in FIG. 6 can be used to clamp the stems of plant tips under tension to the wreath ring 30. Again, the stems can be staggered so that the plant tips cover the previous stems and tie 35. A variety of other clamping and tieing techniques using biodegradable materials such as biodegradable plastics and fabric cords can also be used for tieing and clamping plant tips to the biodegradable wreath rings.

Figure 7:
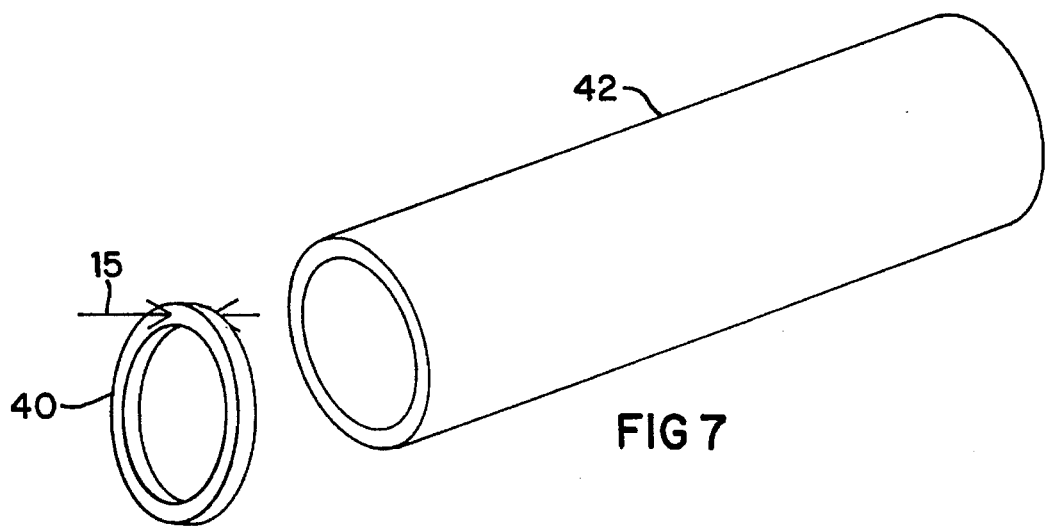
FIG. 7 is a simplified perspective view of a laminated paper tube with a slice cut off for a biodegradable wreath ring according to the invention.

According to one method of construction of the wreath rings, shown in FIG. 7 the wreath ring 40 is sawn, cut, or sliced from a laminated paper tube 42 having a specified cylindrical radial thickness and selected number of layers of laminated paper in the radial direction of the tube. As shown in FIG. 7 the wreath ring 40 is cut to provide a desired cylinder height thickness 15 which is generally comparable to the cylinder wall radial thickness 14. Both the cylinder radial thickness 14 and cylinder height thickness 15 dimensions are selected to provide the necessary structural support for the diameter of the laminated paper tube 42 and wreath ring 40 to support the completed decorative wreath. Such laminated paper tubes having a variety of dimensions for cutting wreath rings of different sizes are available from a variety of sources such as for example Mercer Paper Tube Corporation whose address is 91 Glenn Street, Lawrence, Mass. 01843.

While the invention has been described with reference to particular example embodiments it is intended to cover all modifications and equivalents within the scope of the following claims.

We claim:

1. A wreath ring for constructing a decorative wreath from plant tips and decorative materials secured to the wreath ring by clamping or binding stems to the wreath ring comprising:

a ring of generally circular configuration with selected diameter and constructed from multiple layers of strips of paper laminated one over another in the radial direction of the ring and bonded together using a biodegradable resin or adhesive material;

said ring being of generally cylindrical configuration having a cylinder radial thickness and a cylinder height thickness;

said ring being constructed with a sufficient number of layers of paper in the radial direction and with sufficient cylinder radial thickness and cylinder height thickness to provide the required structural strength to support a wreath constructed of plant tips and decorative material by clamping or binding stems to the wreath ring and having the selected diameter;

said wreath ring thereby being biodegradable for recycling fiber, composting, chipping, or combustion along with a wreath constructed using said wreath ring after the wreath has served its decorative purpose.

2. The wreath ring of claim 1 wherein the ring is a cylindrical slice, cut with specified cylinder height thickness from a laminated paper tube having a specified cylinder radial thickness and selected number of layers of laminated paper in the radial direction of the tube.

3. The wreath ring of claim 1 wherein the ring is constructed with approximately the same cylinder radial thickness and cylinder height thickness.

4. The wreath ring of claim 1 wherein the ring is constructed with a radial thickness in the range of approximately 0.5" to 2" and a cylinder height thickness in the range of approximately 0.25" to 1.5".

5. The wreath ring of claim 4 wherein the ring is constructed with a diameter in the range of approximately 8" to 5'.

6. The wreath ring of claim 1 wherein the ring is constructed from laminated layers of kraft paper bonded together by adhesive or resin selected from the group consisting of silicate glues, starch glues, and white glues.

7. A wreath constructed by securing plant tips and decorative materials to the wreath ring of claim 1, wherein the plant tips and decorative materials are secured by clamping or binding stems to the wreath ring using a biodegradable cord or clamps.

8. The wreath ring of claim 1 wherein the ring is coated with a thin film of a temporary waterproofing coating.

9. The wreath ring of claim 8 wherein the temporary waterproofing coating is a thin film of polyurethane.

10. The wreath ring of claim 1 comprising a double rail wreath ring having a relatively smaller diameter first wreath ring constructed according to claim 1 and a relatively larger diameter second wreath ring constructed according to claim 1, said first wreath ring being suspended within the second wreath ring by spokes of biodegradable material extending between the first and second wreath rings.

11. The wreath ring of claim 10 wherein the spokes comprise flexible cord.

12. A wreath ring for constructing a decorative wreath from plant tips and decorative materials secured by clamping or binding stems to the wreath ring comprising:

a ring of generally circular configuration with selected diameter and constructed from multiple layers of strips of kraft paper laminated one over another in the radial direction of the ring and bonded together using a biodegradable resin or adhesive material;

said ring being of generally cylindrical configuration having a cylinder radial thickness and a cylinder height thickness;

said ring being constructed with a sufficient number of layers of paper in the radial direction and with sufficient cylinder radial thickness and height thickness to provide the required structural strength to support a wreath constructed of plant tips and decorative material by clamping or binding stems to the wreath ring and having the selected diameter;

said wreath ring thereby being biodegradable for recycling fiber, composting, chipping, or combustion along with a wreath constructed using said wreath ring after the wreath has served its decorative purpose;

said ring being a cylindrical slice, cut with specified cylinder height thickness from a laminated paper tube having a specified cylinder radial thickness and selected number of layers of laminated kraft paper in the radial direction of the tube.

13. The wreath ring of claim 12 wherein said ring is coated with a thin film of a temporary waterproofing coating, and wherein the temporary waterproofing coating is a thin film of polyurethane.

14. The wreath ring of claim 12 wherein the ring is constructed with a cylinder radial thickness in the range of approximately 0.5" to 2" and a cylinder height thickness in the range of approximately 0.25" to 1.5" and with a diameter in the range of approximately 8" to 5'.

* * * * *